US012208048B2

(12) United States Patent
Hancock et al.

(10) Patent No.: US 12,208,048 B2
(45) Date of Patent: Jan. 28, 2025

(54) APPARATUS TO AID WALKING

(71) Applicant: UEA ENTERPRISES LIMITED, Norwich (GB)

(72) Inventors: Nicola Joanne Hancock, Norwich (GB); Valerie Moyra Pomeroy, Norwich (GB); David Geoffrey Robinson, Berkhamstead (GB)

(73) Assignee: UEA ENTERPRISES LIMITED, Norwich (GB)

( * ) Notice: Subject to any disclaimer, the term of this patent is extended or adjusted under 35 U.S.C. 154(b) by 843 days.

(21) Appl. No.: 17/040,403

(22) PCT Filed: Mar. 22, 2019

(86) PCT No.: PCT/GB2019/050817

§ 371 (c)(1),
(2) Date: Sep. 22, 2020

(87) PCT Pub. No.: WO2019/180453

PCT Pub. Date: Sep. 26, 2019

(65) Prior Publication Data

US 2021/0113413 A1 Apr. 22, 2021

(30) Foreign Application Priority Data

Mar. 23, 2018 (GB) .................................... 1804717

(51) Int. Cl.
*A61H 1/02* (2006.01)
*A61H 3/00* (2006.01)
(Continued)

(52) U.S. Cl.
CPC ....... *A61H 1/0262* (2013.01); *A63B 21/4034* (2015.10); *A63B 22/203* (2013.01);
(Continued)

(58) Field of Classification Search
CPC .................. A61H 1/0262; A61H 3/008; A61H 2201/0176; A61H 2201/018;
(Continued)

(56) References Cited

U.S. PATENT DOCUMENTS 430,808 A * 6/1890 Naish ................ A63B 22/0046 601/29
2,093,830 A * 9/1937 Flatley ................ A61H 1/0237 601/29

(Continued)

FOREIGN PATENT DOCUMENTS

CN 103083157 A 5/2013
DE 102008007580 A1 8/2009

(Continued)

OTHER PUBLICATIONS

Bosser, English Translation of "WO-2015101694-A1", Jul. 9, 2015 (Year: 2015).*

(Continued)

*Primary Examiner* — Justine R Yu
*Assistant Examiner* — Alexander Morales
(74) *Attorney, Agent, or Firm* — Howard & Howard Attorneys PLLC

(57) ABSTRACT

An apparatus to aid walking, the apparatus including a base unit, housing a motor; and further including first and second horizontally orientated foot supports, mounted for back and forth parallel motion relative to the base unit; the foot supports each being operably connected to the motor; each foot support including a plurality of planar members, including a base plate, an intermediate plate and a foot plate having an upper surface to receive a user's foot, the intermediate plate being pivotally linked at a first end to the base plate and at a second end to the foot plate.

18 Claims, 20 Drawing Sheets

(51) Int. Cl.

| | |
|---|---|
| *A63B 21/00* | (2006.01) |
| *A63B 22/00* | (2006.01) |
| *A63B 22/20* | (2006.01) |
| *A63B 69/00* | (2006.01) |
| *A63B 71/00* | (2006.01) |

(52) U.S. Cl.

CPC ...... *A61H 3/008* (2013.01); *A61H 2201/0176* (2013.01); *A61H 2201/018* (2013.01); *A61H 2201/0192* (2013.01); *A61H 2201/1207* (2013.01); *A61H 2201/1642* (2013.01); *A61H 2201/1664* (2013.01); *A61H 2201/1671* (2013.01); *A61H 2201/5007* (2013.01); *A61H 2203/0406* (2013.01); *A63B 21/00181* (2013.01); *A63B 2022/0094* (2013.01); *A63B 69/0064* (2013.01); *A63B 2071/0018* (2013.01)

(58) Field of Classification Search

CPC .... A61H 2201/0192; A61H 2201/1207; A61H 2201/1642; A61H 2201/1664; A61H 2201/1671; A61H 2201/5007; A61H 2203/0406; A61H 2201/0173; A61H 2201/1215; A61H 2201/16; A61H 2205/12; A61H 1/0237; A61H 2201/0196; A61H 2201/123; A61H 2201/1238; A61H 2201/164; A61H 2201/1652; A61H 2201/5058; A61H 2205/088; A61H 2205/10; A61H 2230/825; A63B 21/4034; A63B 22/203; A63B 21/00181; A63B 69/0064; A63B 2022/0094; A63B 2071/0018; A63B 21/0058; A63B 22/0015; A63B 22/0046; A63B 22/0664

USPC ............................................................ 601/29

See application file for complete search history.

(56) References Cited

U.S. PATENT DOCUMENTS 4,360,978 A * 11/1982 Simpkins ................. A43B 5/18 36/114
4,529,194 A * 7/1985 Haaheim ............ A63B 22/0005 482/70
4,534,124 A * 8/1985 Schnell .................. A63B 25/10 36/114
4,696,470 A * 9/1987 Fenner ..................... A63B 1/00 482/17
4,960,276 A * 10/1990 Feuer ................... A63B 22/203 482/4
5,911,650 A * 6/1999 Cox ................... A63B 69/0022 482/70
5,941,800 A * 8/1999 Laconis ................. A63B 69/18 482/70
6,168,548 B1 * 1/2001 Fleming ................... A63B 3/00 482/41
8,549,773 B2 * 10/2013 Nakatsuka ........... A43B 13/183 36/27
8,617,033 B2 * 12/2013 Stewart .................... A43B 7/38 36/7.8
8,920,347 B2 * 12/2014 Bayerlein ........ A63B 21/00181 601/5
9,616,283 B1 * 4/2017 Heineck ................. A61H 1/024
9,636,539 B1 * 5/2017 Brumit ................... A63B 21/22
11,173,335 B2 * 11/2021 Horne .................... A63B 22/00
2004/0053753 A1 * 3/2004 Galvez Campos .. A61H 1/0255 482/70
2005/0009668 A1 * 1/2005 Savettiere .......... A63B 22/0664 482/54
2010/0248903 A1 * 9/2010 Cardile ............. A63B 21/0058 482/51
2010/0268129 A1 * 10/2010 Park ....................... A61H 3/008 601/35
2014/0087920 A1 * 3/2014 Nickel ..................... A63B 3/00 482/41
2016/0213972 A1 * 7/2016 Waldner ............. A63B 22/0058

FOREIGN PATENT DOCUMENTS

| | | | | |
|---|---|---|---|---|
| JP | 3009889 B1 | | 2/2000 | |
| KR | 100841177 B1 | | 6/2008 | |
| SU | 1533710 A1 | | 1/1990 | |
| WO | 2009/035176 A1 | | 3/2009 | |
| WO | WO-2015101694 A1 | * | 7/2015 | ............. A63B 25/10 |
| WO | 2018/192861 A1 | | 10/2018 | |

OTHER PUBLICATIONS

International Search Report (International Application No. PCT/GB2019/050817); Mail Date: Jun. 4, 2019; 3 pages.

* cited by examiner

APPARATUS TO AID WALKING

TECHNICAL FIELD

The present invention generally relates to a rehabilitation apparatus for aiding in learning or relearning to walk, particularly following a person having suffered a stroke or other traumatic loss of movement in the lower limbs.

BACKGROUND AND PRIOR ART

There are a number of causes for a loss of function or control of lower limbs, which can include serious brain events, injury, and illness. Where an individual suffers such a loss, this can severely impair their ability to walk. Relearning to walk is often a lengthy process requiring the aid of physiotherapists and other health professionals. Tools for aiding this relearning are becoming increasingly dated, and space consuming.

Current rehabilitation methods for relearning how to walk include a set of, rudimentary, parallel bars. These bars are set to the appropriate height for the user, who then supports himself in order to move their legs. This method, although simple, has been shown to aid in relearning. The method however, proves a problem for an individual where they reach the end of the bars, and have to turn 180 degrees to continue using the bars to support himself. Turning himself can prove an energy consuming task, which detracts from the narrower focus of relearning each stage of the leg movement in the walking process.

This project addresses the need for a cost-effective, user-friendly device to meet a priority rehabilitation need: the ability to walk independently after stroke. This innovation is expected to also meet the requirements of other patient groups. Existing devices for retraining walking: have limited evidence of benefit, are expensive, are difficult to use in rehabilitation settings particularly in peoples' homes, and/or are poorly designed. Current clinical practice, i.e. 2-3 therapists supporting legs/arms/trunk of the stroke survivor, cannot provide sufficient repetitive practice of the normal walking needed to drive brain recovery. Electromechanical walking training is recommended in national stroke guidelines but our market research indicates lack of a device: for practice of normal walking patterns; usable in rehabilitation settings; and commercially viable to manufacture and market.

Further current rehabilitation methods consist of the use of treadmills. The general nature of a treadmill provides a system having a moving belt which does not provide any guidance for appropriate placement of the foot, unless a therapist is present who actually lifts the foot for the patient-typically supported by a body harness—as the foot travels along the planar surface of the foot-engaging portion. This planar motion of foot travel does not rehabilitate a user to lift and plant their foot as they would when walking normally, rather this method produces a foot sliding action. Moreover, on a typical treadmill there is a serious risk of the user tripping.

It is to these problems amongst others, that the invention attempts to offer a solution.

SUMMARY OF THE INVENTION

According to a first aspect of the invention, there is provided an apparatus to aid walking, the apparatus comprising a base unit, housing a motor; and further comprising first and second horizontally orientated foot supports, mounted for back and forth parallel motion relative to the base unit;

- the foot supports each being operably connected to the motor;
- a foot support comprising a plurality of planar members, including a base plate, an intermediate plate and a foot plate having an upper surface to receive a user's foot, the intermediate plate being pivotally linked at a first end to the base plate and at a second end to the foot plate.

Optionally, the foot plate includes a retention means to retain the foot against an upper surface of the foot plate. Further optionally, the foot plate includes a heel support to provide stability to a user's foot.

Preferably, the foot supports are housed for motion within channels within the base unit and further preferably, the upper surfaces of the foot plates are below or level with the upper surface of the base unit to enable a user to step down onto or simply across from the base unit onto the foot supports.

Conveniently, the foot supports are independently moveable back and forth. Alternatively, the movement of the foot supports is linked by means of a coupling, forward motion of one of the foot supports causing rearward motion of the other foot support.

Preferably, back and forth motion of the foot supports is governed by a processor to enable a specified programme of movements to be undertaken by a user, which processor is further preferably an Arduino processor.

Advantageously, the apparatus includes a stop button, operation of which, disconnects power to the foot supports, which allows a support worker to aid a user more easily in the event of problems occurring.

Optionally, the apparatus comprises two independently operable motors, the first motor driving the first foot support and the second motor the second foot support.

Preferably, one or more supports extend upwardly from the base unit to act as hand support for a user or to provide a suitably elevated location point for other forms of support for the upper body, which varies according to different patients' needs. Further preferably, the height of the support on top of the base is adjustable. Yet further preferably, a support comprises two upright support elements extending from the base, one rearward of the base unit and one forward of the base unit, and connected by a cross-piece. Still yet further preferably, the vertical supports are pivotally mounted to the base unit, enabling the tubular supports to be pivoted to lie against the base unit for storage or transport. More preferably, the apparatus comprises two supports to either side of a user to aid a user in retaining upright whilst using the apparatus.

Preferably, a motor is connected to the foot supports by one or more drive belts, said belt being selected from a toothed belt, chain belt or the like.

Optionally, the intermediate plate is linked by means of a hinge to the base plate to allow the front end of the intermediate plate to pivot away from the base plate.

Further optionally, the foot plate is linked by means of a hinge to the front end of the intermediate plate. Yet further optionally, the intermediate plate is linked to the foot plate between the front and the back of the foot plate, and still further optionally to the front half of the foot plate.

BRIEF DESCRIPTION OF THE FIGURES

The invention will now be described with reference to the figures, of which.

| Table of Figure Labels | |
|---|---|
| 1 | Device (or apparatus) |
| 2 | Top platform |
| 3 | Ground-engaging base |
| 4 | Raised forward portion |
| 5 | Flat portion |
| 6 | Right footplate |
| 7 | Left footplate |
| 8 | Right support |
| 9 | Left support |
| 10 | a/b handle apertures |
| 11 | a/b handle apertures |
| 12 | Forward portion emergency stop |
| 13 | a/b support emergency stop |
| 14 | Support adjust pin |
| 15 | a/b user engaging handle |
| 16 | Right runway |
| 17 | Left runway |
| 18 | Hinge left |
| 19 | Hinge right |
| 20 | Handle apertures |
| 21 | Support apertures |
| 22 | Lower support portion |
| 23 | Upper support portion |
| 24 | Rail |
| 25 | a/b recess |
| 26 | a/b recess |
| 27 | Belt aperture |
| 30 | Ramp |
| 31 | Ramp protrusion |
| 32 | Ramp handles |
| 33 | Hoist |
| 34 | a/b support base frame |
| 35 | a/b/c/d wheels |
| 36 | Support frame |
| 37 | Reinforcement piston |
| 38 | Harness attachment |
| 39 | Manoeuvring handle |
| 40 | Footplate |

-continued

| Table of Figure Labels | |
|---|---|
| 41 | Base |
| 42 | Plate recess |
| 43 | Base hinge |
| 44 | Central plate |
| 45 | Top plate |
| 46 | Top plate hinge |
| 47 | Strap |
| 48 | Heel support |
| 49 | Foot-receiving portion |
| 50 | Carry handle |
| 51 | Toe-receiving end |
| 52 | User rear support |
| 53 | Support bar |
| 54 | Engaging hook right |
| 55 | Engaging hook left |
| 56 | Locking pin |
| 57 | Locking pin |
| 58 | User-engaging support portion |
| 59 | Toothed belt |
| 60 | Controls - hoist |
| 61 | Emergency stop button - hoist |
| 62 | Hoist apparatus-engaging protrusion |
| 63 | Knee rest |
| 64 | Knee-engaging portion |
| 65 | Knee rest frame |
| 66 | Top portion engaging means |
| 67 | Hoist frame centre unit |
| 68 | Ground engaging base $1^{st}$ end |
| 69 | Ground engaging base $2^{nd}$ end |
| 70 | Motor right |
| 71 | Motor left |
| 72 | Right toothed belt |
| 73 | Left toothed belt |
| 74 | Right receiver |
| 75 | Left receiver |
| 76 | Side support attachment |
| 77 | Support portion |
| 78 | Locking pin |
| 79 | Angle adjustment knob |
| 80 | User-engaging portion |
| 81 | Support-engaging hook |
| 82 | Lower portion |
| 83 | Upper portion |
| 150 | Apparatus |
| 151 | Seat arrangement |
| 152 | Stand |
| 153 | Knob |
| 154 | Seat |
| 155 | Support arms |
| 156 | Main body |
| 164 | Seat |
| 170 | Apparatus |
| 171 | Support sling |
| 190 | Support arm |
| 191 | Central member |
| 192 | Attachment fingers |
| 193 | Support panel |
| 194 | Support vest |
| 195 | Foam waistband |
| 196 | Under-arm section |
| 200 | Support vest |
| 210 | Support vest |
| 211 | Seat |
| 220 | Support bracket |
| 221 | Arms |

DETAILED DESCRIPTION OF THE INVENTION

Figure 1:
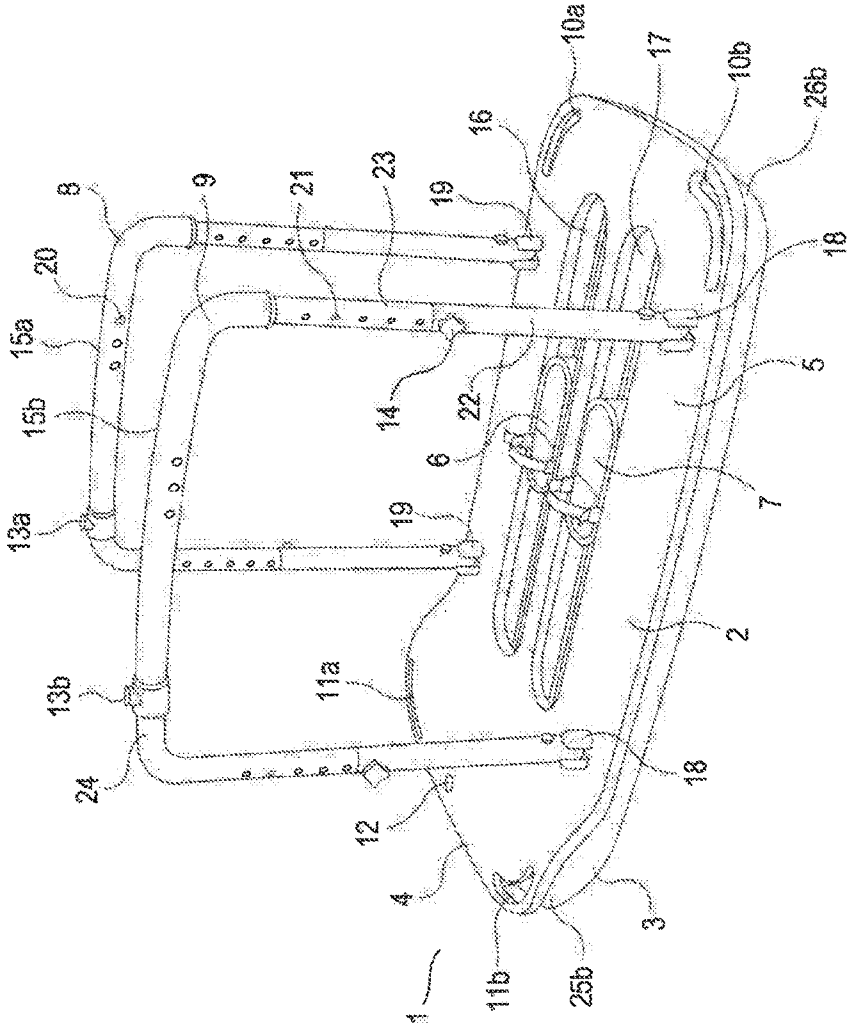
FIG. 1 is a perspective view of an apparatus.

FIG. 1 displays the device 1 in accordance with an embodiment of the invention. The device 1 comprises a ground-engaging base 3, a top platform 2, and right 8 and left 9 supports. The device 1 in use, provides assistance to those undergoing rehabilitation in order to facilitate their re-learning, or learning how to walk.

The top platform 2 comprises a raised forward portion 4 and a user-engaging flat portion 5. The flat portion 5 comprises a right runway 16 and a left runway 17. The runways 16, 17 are elongate apertures in which footplates 6, 7 are slidably housed such that the footplates 6, 7 can move in a back and forth motion along the respective runway 16, 17. The footplates 6, 7 are also housed such that their upper surfaces are at the same height, where the top surface, or foot-receiving portion 49, is level with the surface of the top platform 2. This aids a user in stepping on and off the footplates. The height of a footplate 6, 7 is optionally adjustable to take the account of any variations in effective length of a user's leg. In an alternative optional embodiment, not illustrated, the patient's leg length can be taken into account by altering the stroke of the platform's reciprocating motion. The footplates' 6, 7 movement is driven by a motor located within the body of the device 1.

Although the footplates 6, 7 can be housed in the runways 16, 17, the footplates 6, 7 do not have to be in contact fit with the vertical walls of the runways 16, 17. This allows an individual footplate 6, 7 to rotate about an approximately vertical axis of the footplate 6, 7 centre point. By allowing this rotation, the footplate 6, 7 can be rotated to enable use by those users whose feet point inwards or outwards during walking. The rotation also allows a user who may swing their leg outward in order to take a step, to maintain their foot within the footplate 6, 7 itself. The footplate 6, 7, can however, be fitted with a compliant or fixed-stop limiter, in order to reduce the rotational movement. This enables a user's movement to be limited or controlled, where the user displays an excessive foot or leg motion which needs to be corrected.

Extending from the flat portion 5 are four hinge mountings: two left hinge mountings 18 located toward the outer edge of the flat portion 5, and two right hinge mountings 19 located to the edge of the parallel edge portion. Each pair of hinge mountings 18 and 19, hingeably engages in-use lower end 18*a, b*, 19*a, b* of a left 9 and right 8 support. Each support extends, in use, upwardly perpendicular to the surface of the flat portion 5. Each support 8 and 9 is constructed of two uprights and a connecting rail 24. The uprights comprise a lower support portion 22 and an upper support portion 23. The lower support portion 22 includes a support adjust pin 14. The support adjust pin 14 extends through an aperture on each side of the lower support portion 22, to lock the upper support portion 23 at a desired height. The upper support portion comprises a series of apertures 21 for receiving the support pin 14 in use. The particular aperture 21 allows the connecting rail 24 to be brought to a height to suit the user. The connecting rail 24 of the support 8 and 9, comprises a handle 15*a* and 15*b* that a user can hold onto. Each handle 15*a* and 15*b* comprises a series of apertures 20, to which attachments can be secured, as detailed in later embodiments.

Each support 8, 9 comprises an emergency stop button 13*a* and 13*b*. A further emergency stop button 12 is located on the raised forward portion 4. The emergency stop buttons 13*a* and 13*b* on the supports 8, 9 are located to provide ease of access for a user or their aide to deactivate the device 1 motors immediately. The height at which the emergency stop buttons 13*a* and 13*b* are arranged also allows ease of access for a supporting health professional to stop the motors. The emergency stop button 12 of the forward portion 4 of the top platform 2 is located for ease of interaction by a foot. A supporting health professional can deactivate the device 1 motors by foot interaction with the emergency stop button 12 whilst maintaining interaction with the user. In a further embodiment, not illustrated, if power beyond a pre-set value is drawn, this can be taken as an indication that the machine is jammed, possibly by something being caught in the drive mechanism, and the power cut. In a yet further non-illustrated embodiment, an automatic kill switch style emergency stop is accommodated. Such a device consists, for example, of a fixed cord attached to the user on one end, and the device on the other end. If the patient or supervisor pulls or yanks the cord, or the user falls or moves outside the radius of the designed cord length, the switch automatically stops the machine safely The top platform 2 comprises handle apertures 10*a* and 10*b*, and 11*a* and 11*b*. The ground engaging base 3 comprises recesses 25*a* and 25*b*, and 26*a* and 26*b* that mirror the location and shape of the handle apertures 10 and 11, allowing a user or users to carry and/or manoeuvre the device 1. Ground-engaging wheels, which can be lockable against rotation, can be provided to aid in the movement of the device 1 between locations.

The left and right runways 17 and 16 are located in the flat portion 5 of the top platform 2, situated parallel to one another. Each runway 17 and 16 comprises a footplate 7 and 6 which, in use, travels back and forth along the length of the runways 17 and 16 respectively, to aid in simulating the walking process.

Figure 2:
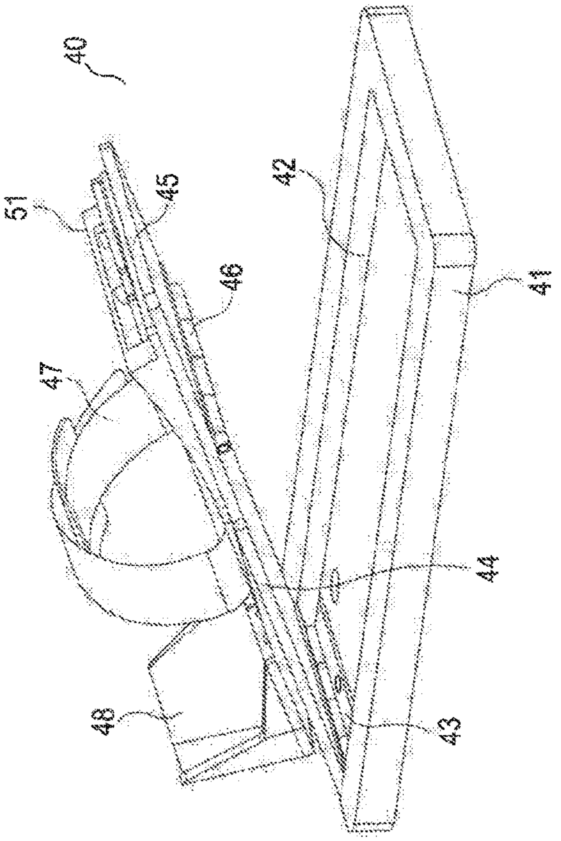
FIG. 2 illustrates a foot support in a first configuration.
Figure 3:
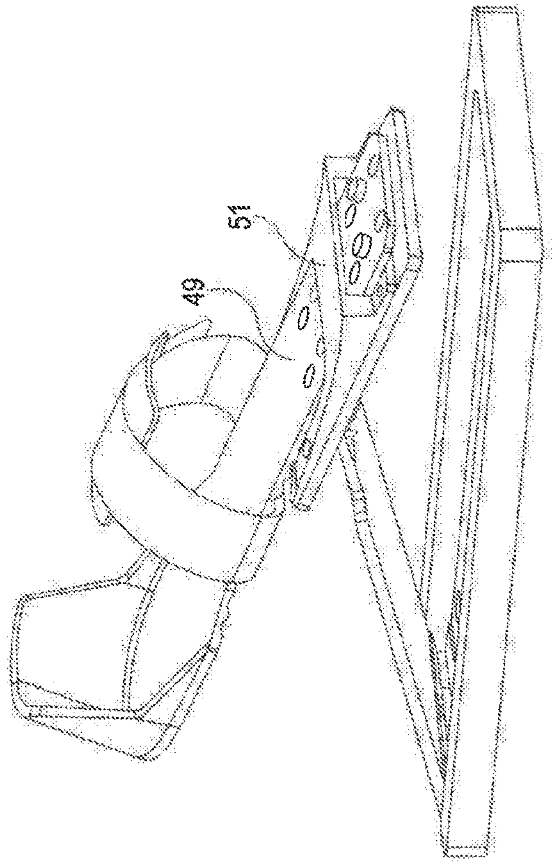
FIG. 3 illustrates a foot support in a second configuration.

FIGS. 2 and 3 display a footplate 40 at, respectively, two operational, in use, positions. Each figure shows a footplate 40 having a base 41, a base hinge 43 that forms the join between the base 41 and the central plate 44 and allows the plate 44 to pivot relative to the base 41. A top plate hinge 46 joins the central plate 44 to a top plate 45, the hinge 46 enabling the central and top plates to pivot relative to each other about the hinge axis. The hinge 46 pivotally joins the central plate 44 and top plate 45 together, the end of the central plate 44 meeting the underside of the top plate 45, part-way between the centre and front end of the top plate 45. This enables the normal walking foot motion to be mimicked more readily than when the central and top plates 44, 45 are joined along their respective front ends. The top plate 45 supports a foot receiving portion 49 which can be adjusted to accommodate different feet sizes. The arrangement of the footplate 40 is that of a Z-plate mechanism. The Z-plate mechanism comprises three plates, of which a central plate comprises a hinge at each end, with a second plate attached to one hinge, and a third plate attached to the second hinge. The use of a pivot link constrains the foot's forward/back and side-to-side motion, yet still allows the foot to be lifted vertically with minimal impediment.

The user's foot is maintained in position on the footplate 40 by the heel support 48, and strap 47 which maintains the forward portion of a user's foot against the foot receiving portion 49. This arrangement allows the foot to flex around the big toe joint. The foot receiving portion 49 is formed of a flexible material, for example a soft plastic, or thick rubber that allows the foot receiving portion 49 to flex with the user's foot in use. By providing a flexible material for the foot receiving portion 49, the heel support 48 can move with the user's heel, and remain in contact throughout the multiple positions that result through a range of walking gait motions.

FIG. 2 displays the arrangement of the footplate 40 as a user's foot is approaching the heel strike point of a stride. In this embodiment, the base hinge 43 is opened, as the central plate 44 is removed from the base plate recess 42. Throughout use, as the base hinge 43 closes, the angle between the central plate 44 and the base recess 42 decreases. The top plate hinge 46 is in its fully opened position, which maintains the top plate 45 in contact with the central plate 44. The base of the foot-receiving portion 49 is in contact with the top surface of the central plate 44, with the heel support portion 48, maintaining the user's heel in position on the footplate 40.

FIG. 3 displays the arrangement of the footplate 40 as a user's foot is lifting off the base 41. The base hinge 43 is opened, and the angle between the central plate 44 and the recess 42 is increasing. When walking, an individual lifts their striding foot from the ground, and draws the heel upward as the leg begins its swing forward. This motion draws the heel support 48 away from the central plate 44, pivoting the top plate 45 downwards, which decreases the angle of the top plate hinge 46 between the top plate 45 and the central plate 44.

Pivoting about the top plate hinge 46 is assisted at this part of the stride by pressure from the front of the user's foot on the portion of the top plate 45 forward of the top plate hinge 46, the force about the top plate hinge 46 thereby provided acting about the top plate hinge 46 in the same rotational manner as that produced by lifting the heel support 48. As the user draws up on the footplate 40, the base 41 slides forward in its respective runway. This sliding motion replicates the act of striding in walking. As the footplate 40 travels forward in a prescribed and controlled motion on its runway, the second footplate, attached to a user's second leg, slides rearward, also in a controlled motion. This replicates the action of a striding leg passing a stationary leg in walking.

Each runway comprises a recess wherein the centre portion comprises an aperture, into which a toothed belt is positioned. The walls of the recess are constructed so as to comprise a low friction guiding surface that is in contact with the sides of a footplate. This allows the footplate to slide against these surface, in use. The base of the footplate has wheel or race bearing carriages or similar means to allow the footplates to have low rolling resistance Each individual footplate 40 is attached to a toothed belt, chain or other suitable means within the runway recess. For example, linear actuation means such as pneumatic, hydraulic, electrical, ball and lead screw, chain, rack and pinion or cable mechanisms can be used. The toothed belt means is connected to a pulse width modulation (PWM) servo motor. Other methods of linear speed control to vary speed can be used (e.g. in the case of AC servos, frequency control), in the case of a CVT (constantly variable transmission) gearbox, dynamic change of gearbox ratio, can be used. The motor is variable speed, and can be controlled by either the user, an operator or a microcontroller such as an Arduino microcontroller, and piggyback 10A 'buffer' shield. As an alternative a stepper motor can be used. Each runway, or carriage, is independent from the other. The mode of operation of the runway and footplate 40 function is to synthesize characteristic human foot positions throughout a range of walking gait motions. The device can be controlled by an operator to ensure that the speed of the footplates along their respective runways is adequate to allow a user to carry out their exercises. The operator can control the speed of the footplate movement within the runways manually, by way of software controlling the device. From the software, the operator can monitor all aspects of speed, and weight distribution between a user's feet. Moreover, the software can be utilised to replicate the front to back motion of a typical stride cycle, controlling aspects such as, and referring to FIG. 9, stride length, acceleration and deceleration of the swing phase steady velocity of walk during the stance phase, the transition from forward to backward motion at heel and toe off etc.

This motion can be derived by reverse engineering via measured gait analyses from patients and healthy subjects. Alternatively, the motion can be synthesized and 'profiled' where this could provide therapeutic benefit. For example, asymmetrical left/right movement, exaggeration or reduction of the acceleration profile, progressive change of stride length during therapy, for example.

First, the foot of the user is attached to the top part of the Z-plate (which is a flexible element in this embodiment) so that the foot can be lifted (comparatively) easily off the 'ground'.

This allows the foot to be raised under the user's own effort during the swing (return) phase of the walk. To achieve this important transition, the user must perform a weight shift onto their opposite leg. This is a neurologically significant element of walk and larger prior art, robotic devices 'force' this motion in a less natural fashion. Conversely, treadmill walking, known in the prior art, allows the free passage of the foot during the swing phase, though this is unsafe (trip hazard) and does not instil the acceleration/deceleration movement that the patient is trying to re-learn.

The gait width is constrained. This is fixed by the device, though in some embodiments, the width can be adjusted to suit varying patient needs as a production solution. In addition, adjustment can be made, and means provided to accommodate toe-in and toe-out conditions. This is only limited mechanically by potential interference between the left and right 'plates', though there may be angle limits imposed by user benefit; for example, if the foot was misaligned too far from straight ahead, this could create unfavourable joint loading. This would need to be determined by clinical evaluation.

The footplate used on the device is similar to those known in rowing machines found in a gym. However, effective means to hold the foot in position is important. This method may vary depending on different patient conditions. However, selective compliance (rather than a rigid Z-plate) can make the device more comfortable.

The footplate needs to accommodate a range of foot sizes as a user may or may not be wearing footwear. The heel should be maintained proximate to the rear hinge, such that during heel strike, there is good correlation between the user's heel and the point at which it strikes the ground.

During 'toe off', the foot flex is used to provide momentum to allow the weight shift to the opposite leg (described above). Where a user has difficulty initiating this lift (at the end of the pre-swing), a 'cam' or powered heel 'pusher' can be provided to assist. As a basic form of heel lift device, a switch can be incorporated that halts the walk cycle unless the user lifts the heel at the right moment. However, such a switch can be disruptive to normal walking. The lowest element of the Z-plate is, in effect, the floor 'datum'.

In a further embodiment, the top plate hinge 46 is located at the foot-receiving portion 49 end of the central plate 44. In this embodiment, the foot-receiving portion 49 is flexible along its entirety and joins directly to the top plate hinge 46. This embodiment allows the user to pivot about the toe, further replicating the natural gait by allowing the user to extract the foot from the heel through to the toes. The toes, in use, are positioned about the toe-receiving end 51 of the foot-receiving portion 49. This ensures that the foot-receiving portion 49 moves with the user's foot, and therefore ensures that no excess of the toe-receiving end 51 is present.

To accommodate for users with smaller feet, the heel support 48 can be adjusted to position the user's foot correctly on the foot-receiving portion 49. There are a number of options for adjustment means. These include, a toe region adjustment means that the user adjusts by slotting retaining plugs into receiving apertures. Alternatively, the heel support 48 can be moved respective of the foot-receiving portion 49 by a strap adjustment means, this allows the user to position the heel support 48 so as to ensure that their feet engage the respective foot engaging portions correctly.

The further advantage of the footplate 40 design, which features hinged portions, allows the user to move their ankle. The ankle and feet, comprise proprioceptors, which provide the body's ability to sense movement within joints, and also determine joint positioning. By developing proprioceptors, an individual does not have to look at, for example, their foot in order to determine its positioning. The hinged footplate 40 enables the user to move their feet and ankle in a manner that is less restricted, and therefore develop their proprioception.

Figure 4:
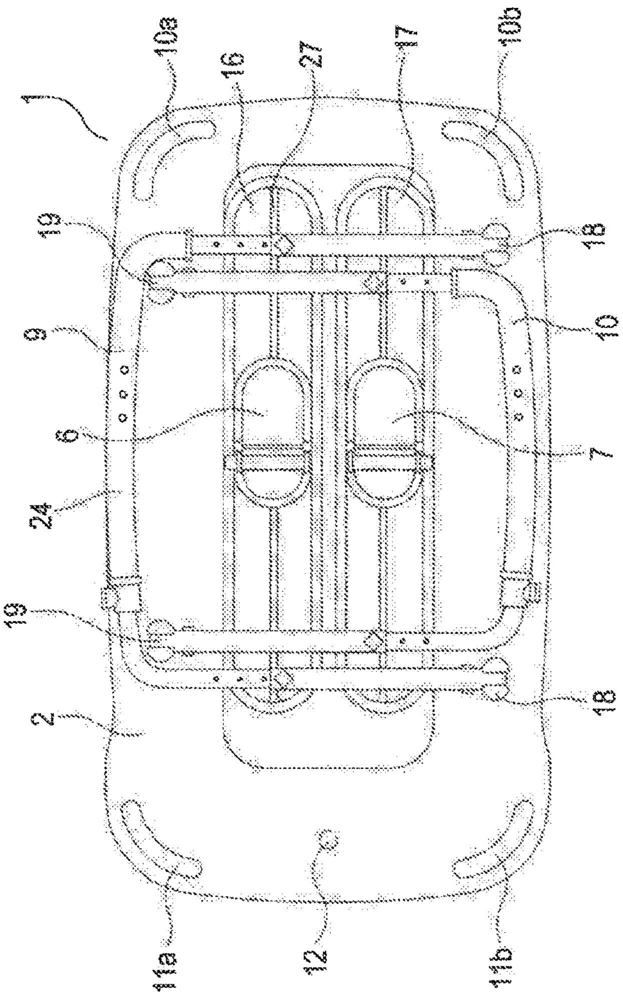
FIG. 4 is a top view of the apparatus with the bars in the stowed position.

FIG. 4 is an aerial view of the device 1, where the supports 8 and 9 have been folded into their storage position. The supports 8 and 9 are folded at hinges 18 and 19 so as not to extend beyond the edges of the top platform 2. The hinges 18 and 19 are arranged so as to allow a larger handle to fold around the hinges of the smaller handle. In this embodiment, the hinges 18 of the left support 9 are further apart, to allow for the support 8 to be folded onto the top platform 2 surface and lie between the two left hinges 18. The right-side hinges 19 are arranged to be closer together than those of the left-side hinges 18. This arrangement allows for the left support 9 to lie outside of the hinges 19. The left support 9 in this embodiment comprises a longer rail 24 than that of the right support 8.

Figure 5:
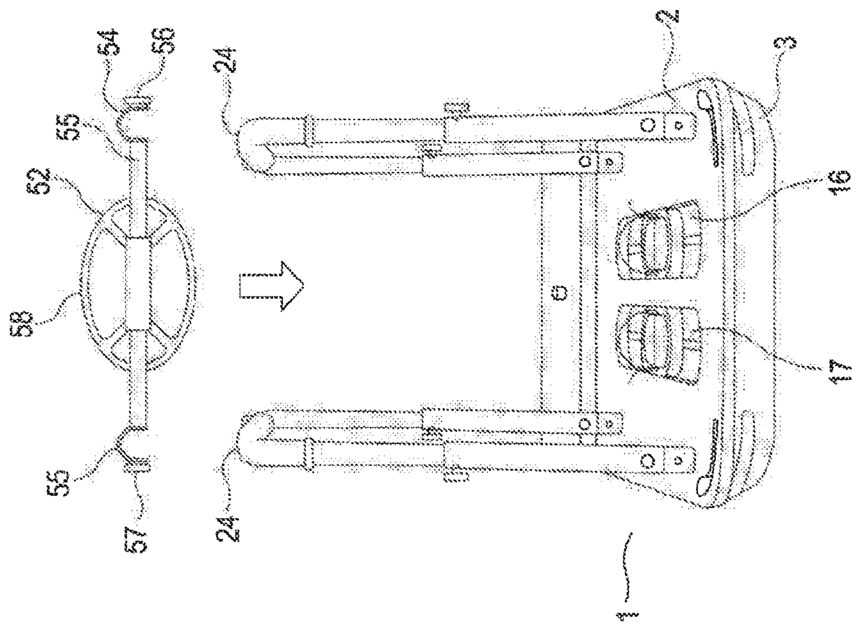
FIG. 5 is an illustrative front view of an apparatus.

FIG. 5 displays the apparatus from the rear, the apparatus 1 having a user rear support 52 installed into its in-use position. The user rear support 52 comprises a user-engaging support portion 58, fixed to a support bar 53. The support bar 53 comprises an engaging hook 54 and 55 at each end. The engaging hooks 54 and 55 are constructed so as to lock onto the connecting rail 24 of the left and right supports 9 and 8 respectively. The hooks 54 and 55 each comprises a locking pin 56 and 57 for engaging the handle apertures 20. The user rear support 52 can comprise belt supporting apertures on the support bar 53. These allow the user to be maintained in position against the user-engaging support portion 58 by tightening or loosening of a belt or strapping means, worn by the user.

Figure 6:
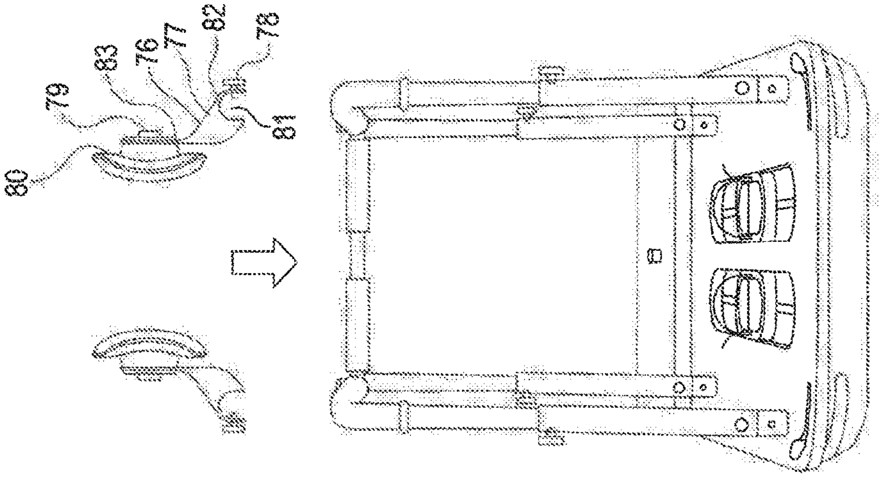
FIG. 6 is a further illustrative rear view of an apparatus.

FIG. 6 is a rear view of the apparatus 1 where a side support attachment 76 is to be installed. The side support attachment 76 comprises a support portion 77, with a lower portion comprising a support-engaging hook 81. The support engaging hook 81 in use, is attached to a support 8 or 9 respectively. The support engaging hook is maintained in position by a locking pin 78 which engages one of the handle apertures 20. An upper portion 83 of the side support attachment 76 supports a user-engaging portion 80, adjustable by an angle adjustment knob 79. The side support attachment 76 is installed to support a user who may have weak core muscles from prolonged time spent prone or sedentary, during which they have not walked or trained their core. The side support attachments 76 can be installed so as to maintain contact with the user throughout use, or allow a pre-determined spacing between the user's torso and the user-engaging portion 80, so as to reduce the support and build the walking strength of the user.

Figure 7:
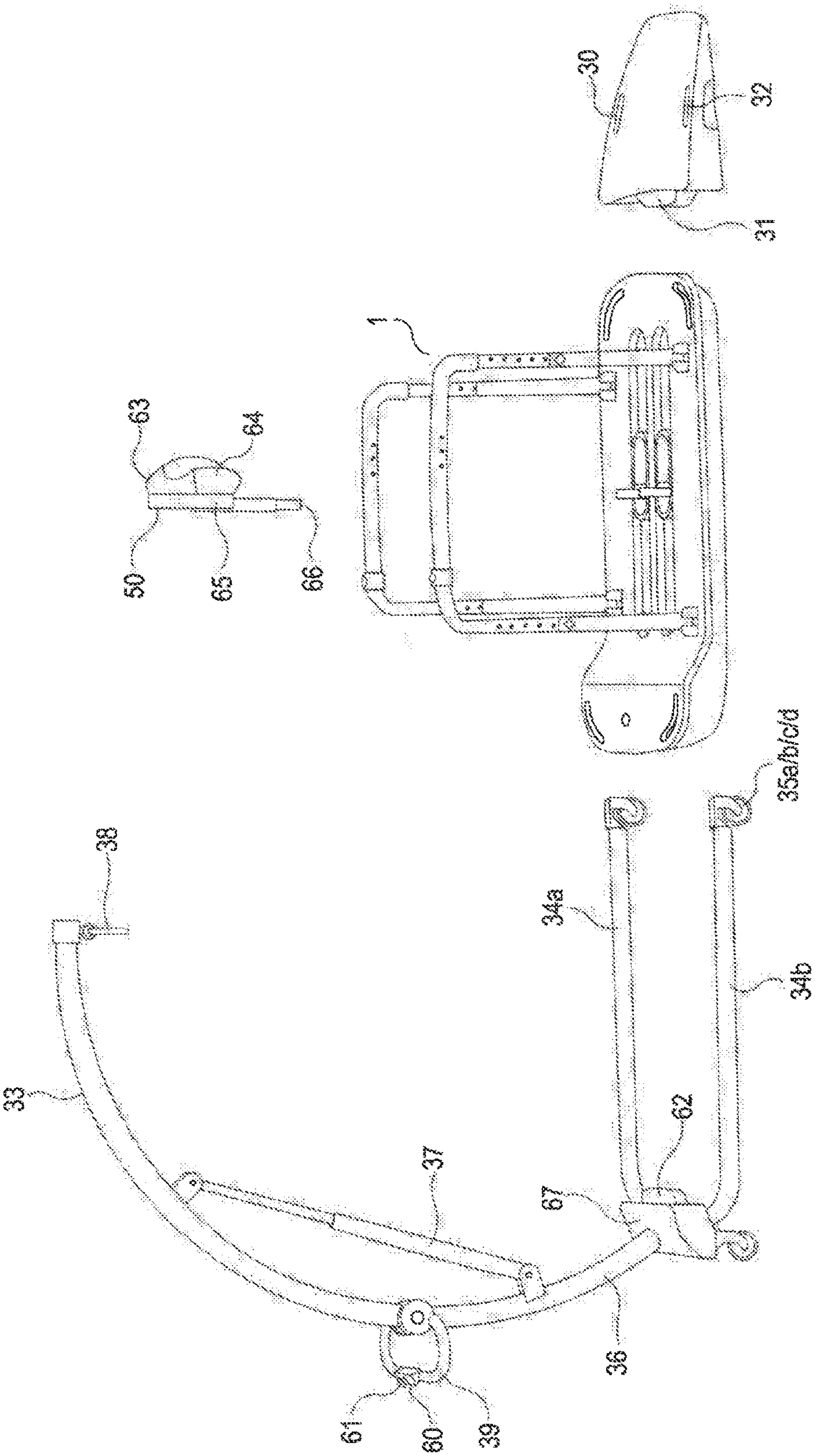
FIG. 7 illustrates use of an apparatus with a hoist.

FIG. 7 is a side view of the apparatus 1 in which three attachments are shown in their pre-installation arrangement, prior to being installed. The first attachment is a ramp 30, comprising a bottom portion-engaging protrusion 31 which in use is positioned with a receiving aperture or recess on the ground-engaging base second end of the apparatus 1. The protrusion 31 ensures that the ramp 30 is maintained in its in-use position relative to the apparatus 1 to prevent shifting of the ramp whilst it is in use. The ramp 30 further comprises handles 32 for aiding in manoeuvring of the ramp 30. The ramp 30 allows for a user's wheelchair to be pushed onto the apparatus 1, so as to allow them to be attached to a hoist 33 and lifted from their wheel chair and into an upright position.

The second attachment is a hoist 33. The hoist 33 comprises left and right support base-frame extensions **34*a* and 34*b*. Each extension 34 comprises a wheel 35*a* or 35*b* at its end portion. Each wheel 35*a* and 35*b* is manoeuvrable about a 360-degree rotation through its attachment to the respective extension 34. Each extension extends from a hoist frame centre unit 67. The extensions 34 are so spaced as to allow the hoist to be positioned about the apparatus 1, where the apparatus 1 is located between the extensions 34. The centre unit 67 comprises two wheels 35*c* and 35*d***, each manoeuvrable about 360 degrees.

A support frame 36 extends upwards from the centre unit 67 to from a curved 'c' profile that extends, in use, over the top of the apparatus 1. A reinforcement piston 37 extends between a lower portion and upper portion of the support frame 36, so as to provide support where flexion in the frame 36 occurs whilst supporting the weight of a user. Alternatively, in place of the reinforcement piston, a linear actuator or locking gas strut can be used to provide the support. The frame comprises a harness attachment means 38 for attaching a user's harness, to support the weight of the user in use. The frame 36 further comprises a manoeuvring handle 39, the handle 39 including controls 60 and emergency stop button 61 for a healthcare worker aiding the user to operate the apparatus for the user. The hoist controls 60 allow for the healthcare worker to raise and lower the user where necessary. The controls in connection with the apparatus are actuated either via an external network through wireless means, or via direct contact through a wire. The centre unit 67 comprises an apparatus-engaging protrusion 62. This protrusion 62 fits into a receiving aperture or recess on the first end of the apparatus 1. This fit, maintains the hoist 33 in its in-use position, by preventing sidewards movement of the hoist 33 relative to the apparatus 1. The hoist 33 can also comprise brakes on an individual or each wheel 35 to prevent shifting of the hoist 33 in use.

The third attachment is a knee rest 63. The knee rest 63 comprises a knee-engaging portion 64, connected to a knee rest support frame 65 comprising a top portion-engaging means 66 at its lowest portion. The knee rest 63 in use acts to support the front of a user's knees, or top of their shins. The knee rest is used to lock the user's lower limbs in position whilst they the hoist is used to lift them into a standing position. A carry handle 50 is located at the top of the knee rest frame 65 so as to allow the knee rest to be removed and installed quickly.

Figure 8:
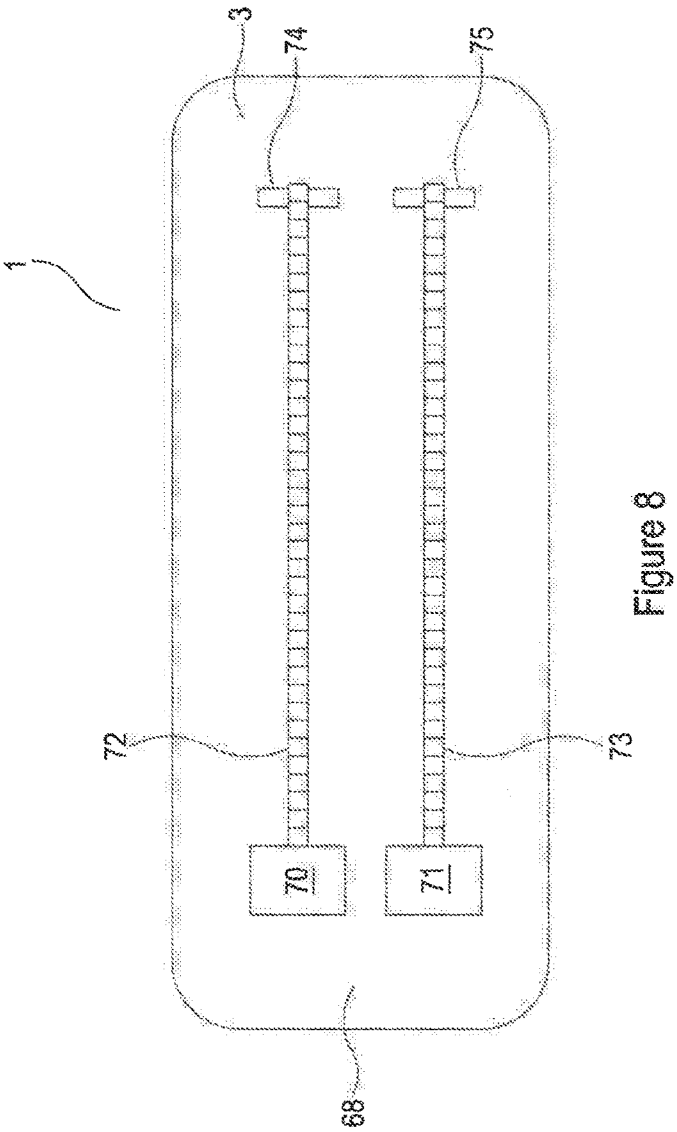
FIG. 8 is a top view of the base unit motor configuration.

FIG. 8 is a top view of the ground-engaging base 3 of the apparatus 1, with the top portion removed. The ground-engaging base 3 comprises two motors 70 and 71, each in contact with a toothed belt 72 and 73. The motors 70 and 71 are located at the first end 68 of the ground-engaging base 3. In use, the top portion of the apparatus (not illustrated) comprises a raised first end, which allows for the top portion to be fitted over the top of the motors 70 and 71, allowing for the motors to be concealed within the apparatus. At the second end 69 of the ground-engaging base 3, the toothed belts 72 and 73 engage their own independent, left and right receivers 74 and 75. Each receiver 74, 75 allows the toothed belt 72 and 73 with which it is in contact to travel away from, or towards its respective motor 70 or 71. The toothed belt 72 and 73 in use moves the respective foot plate along the length of the top portion aperture to which it is connected.

Figure 9:
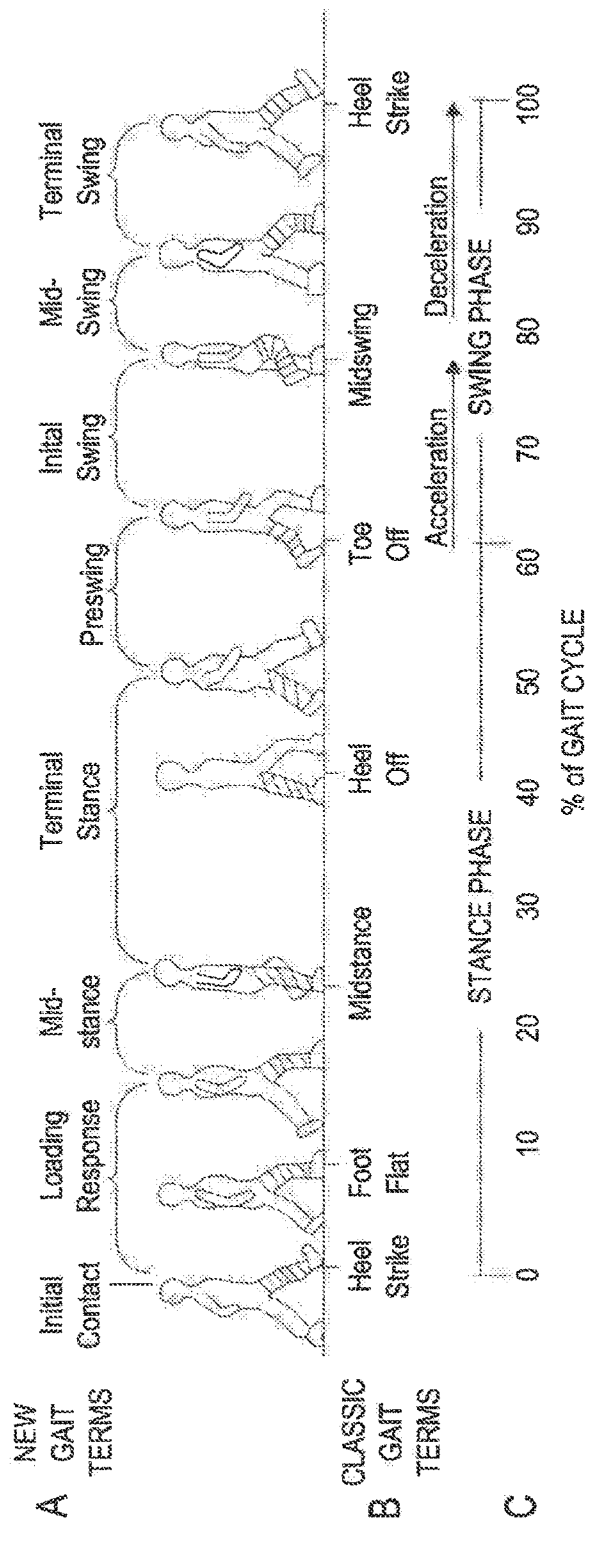
FIG. 9 is a diagram of the gait cycle of a walking human.

FIG. 9 is a diagram of the gait cycle of a walking human. This diagram clearly displays the leg movements of the user when walking. The footplate 40 design is constructed accommodate for the alterations in foot angles throughout the stride. At the heel strike, a user's toes are pointed upward of the ground reducing the angle between the top of the user's foot and the shin. At the midway point of a stride, the angle between the top of the user's foot and shin can be said to be about 90 degrees, which as the user continues their stride, this angle is continuing to increase as the last remaining portion of the foot on the ground is the toes. Throughout the swing forward of the user's leg, the angle between the top of the user's foot and their shin decreases, in preparation for the heel strike where once again the user's toes are pointing substantially upward of the ground. The footplate 40 construction allows the user's foot to move through each phase of the gait, as a result of the hinged portion's structure. This feature is advantageous over the likes of a treadmill, as a treadmill moves a user's foot without requiring that they lift and swing their leg. This further restricts ankle flexion, and subsequently has little benefit to proprioceptor development which in turn is essential for ensuring a user develops their gait. If desired, sensors can be included to detect heel strike and heel off and halt reciprocating movement of moving platforms until such movement is detected, thereby explicitly training or encouraging these aspects of walking—functionality not available on a treadmill.

Figure 10:
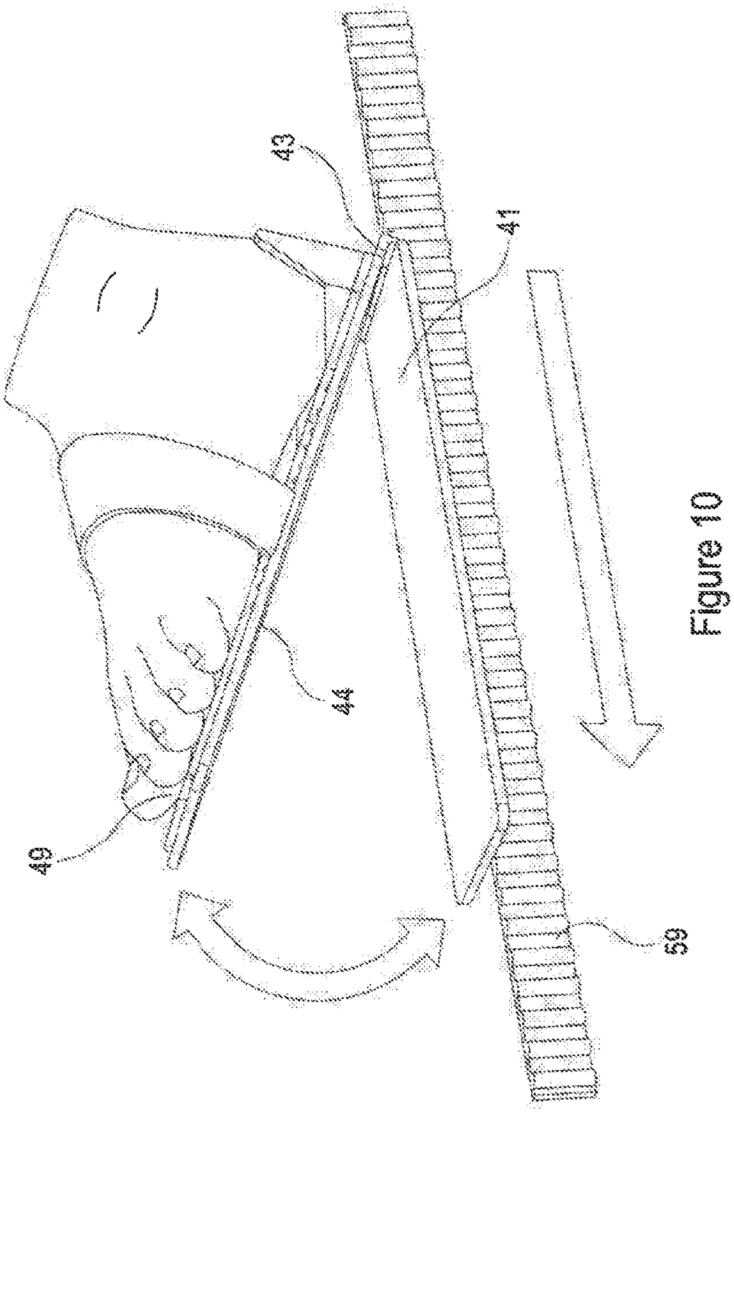
FIG. 10 is a side view of the footplate in the heel strike position.

FIG. 10 is a side view of the footplate 40 and user's foot in the heel strike position. The foot receiving portion 49 is in contact along its entirety with the central plate 44 with the base hinge 43 in the open position. The base 41 is in direct contact with the toothed belt 59, which is moving in the direction of the arrow beneath the toothed belt, as the user plants their foot.

Figure 11:
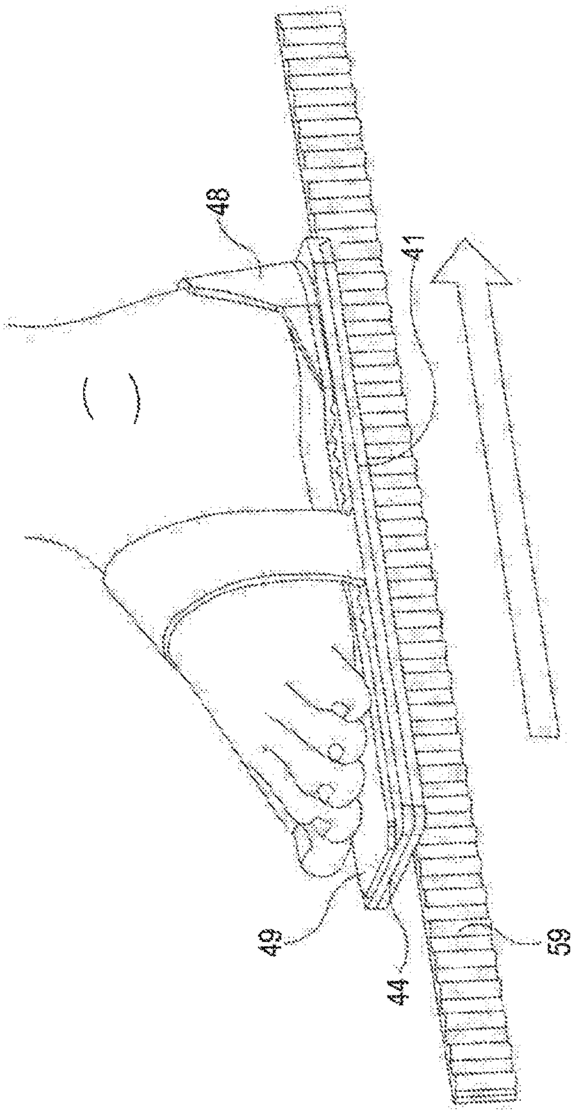
FIG. 11 is a side view of the footplate in the mid stride position.

FIG. 11 is a side view of the footplate 40 and user's foot in the mid stride position. in this embodiment the central plate 44 and foot receiving portion 49 are positioned on top of one another as the toothed belt travels in the direction of the movement arrow.

Figure 12:
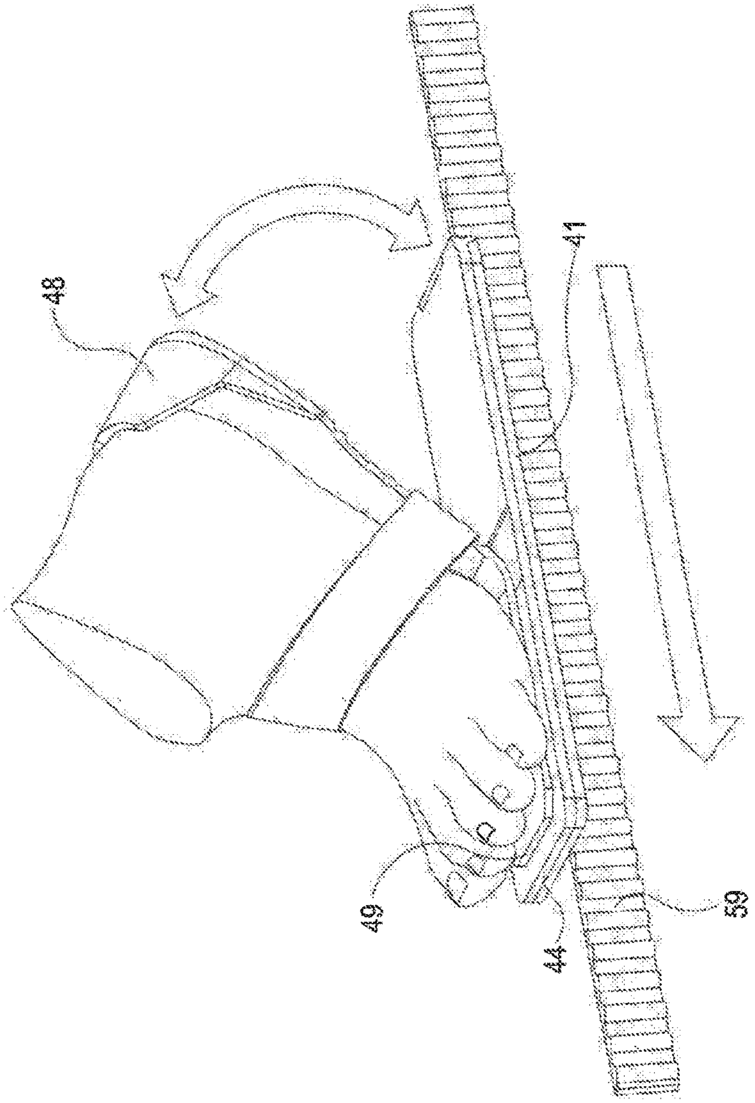
FIG. 12 is a side view of the footplate in the heel off position.

FIG. 12 is a side view of the footplate 40 and user's foot in the heel off position. The flexibility of the foot receiving portion 49 is clearly displayed, as it curves with the natural shape of the base of the user's foot, and allows the foot to roll forward onto the toes. The central plate 44 remains in contact with the base 41 and the base hinge 43 closed. In this embodiment, the foot receiving portion 49 is joined to the central plate 44 at their respective ends. This allows for the user to lift the heel support 48 upward of the central plate 44, and continue elevation without requiring that the central plate 44 prematurely elevate from the base plate 41.

Figure 13:
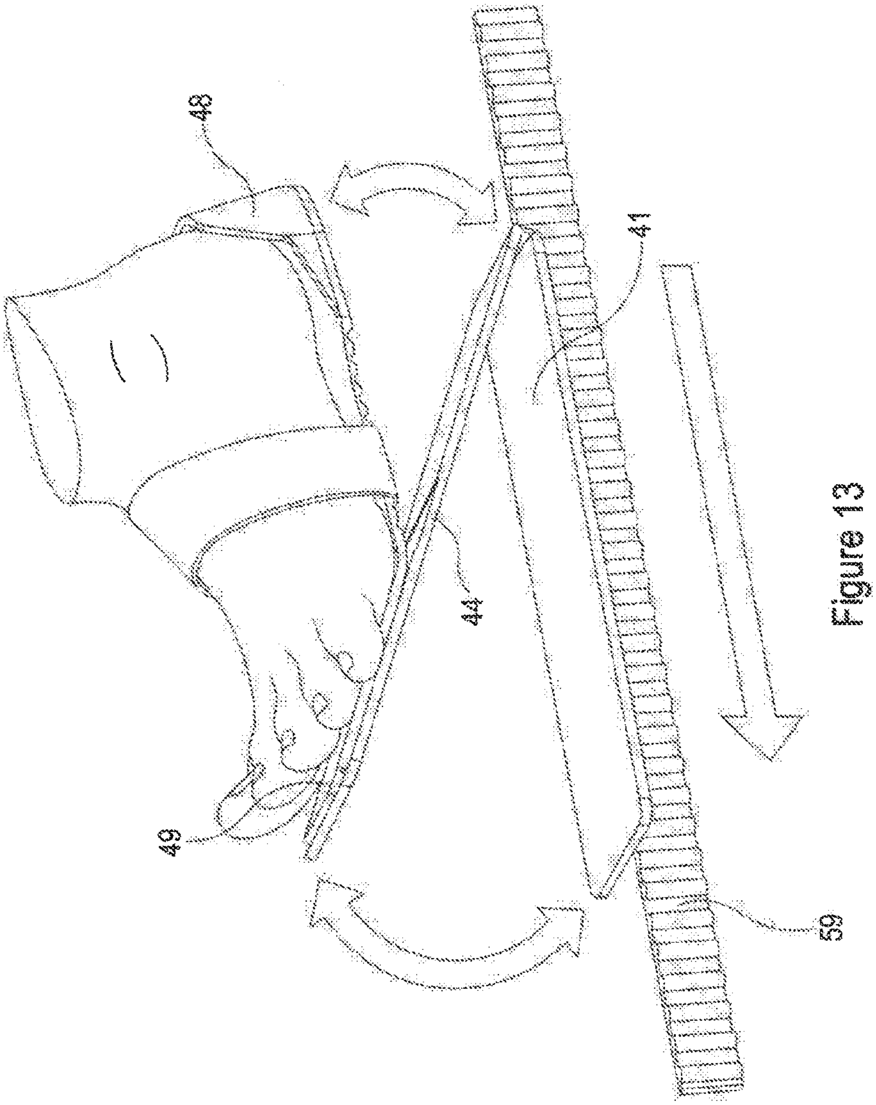
FIG. 13 is a side view of the footplate as it travels past mid swing.

FIG. 13 is a side view of the footplate 40 and user's foot as it travels past mid swing. The tendency in this action is for an individual to elevate their toes upward, so as to round the foot in preparation for heel striking. In this embodiment, we can see that the foot-receiving portion 49 is curved with the user's toes, as the heel support 48 is located away from the central plate 44.

Figure 14:
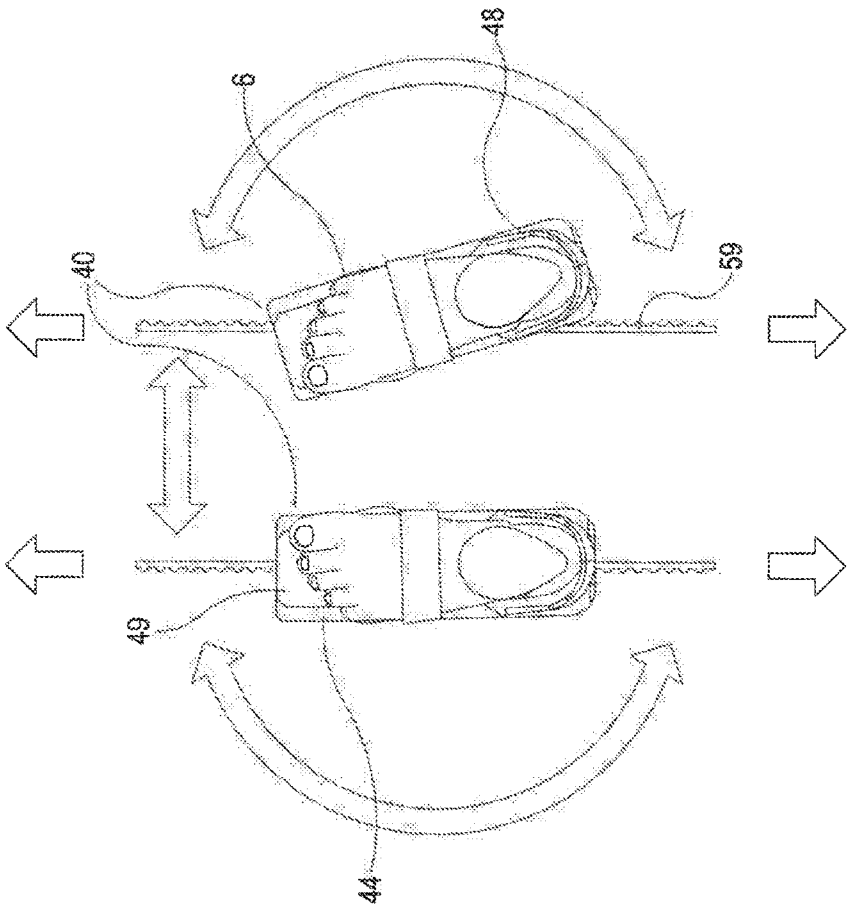
FIG. 14 is an elevational view of two footplates in use.

FIG. 14 is an elevational view of two footplates 40 in use. The right footplate 6 is rotated about the axis of the toothed belt 59. This rotation allows a user's leg to follow its natural swing route. A number of individuals do not swing their feet in one planar motion throughout their walking, and so providing a footplate 40 that merely moves along one plane would not allow them to reacquaint their natural stride and proprioceptive familiarity, subsequently this would be restrictive to the user. The current invention therefore is constructed to allow rotation of the footplate 40 with the user's foot as it travels through the stride, and along the toothed belt 59.

The apparatus 1 can be powered by a number of suitable means. Preferably the apparatus comprises a power cable which can be plugged into a mains electricity source. The power cable extends preferably from the first end of the apparatus 1 so as to reduce the likelihood of the user tripping when mounting the apparatus 1 from the second end. Alternatively, the apparatus can be powered by a suitable battery or other power source known in the art. The battery can, for example, be charged in line when using the apparatus powered from a mains supply. The use of a battery power source enables the apparatus 1 to be more mobile and therefore taken into an area where the power supply is limited.

The apparatus 1 can be provided in varying sizes. The apparatus 1 can be sized to accommodate individuals of different frame sizes, and to accommodate smaller spaces for use, should the user have reduced surface area into which the device can be set up.

Figure 15A:
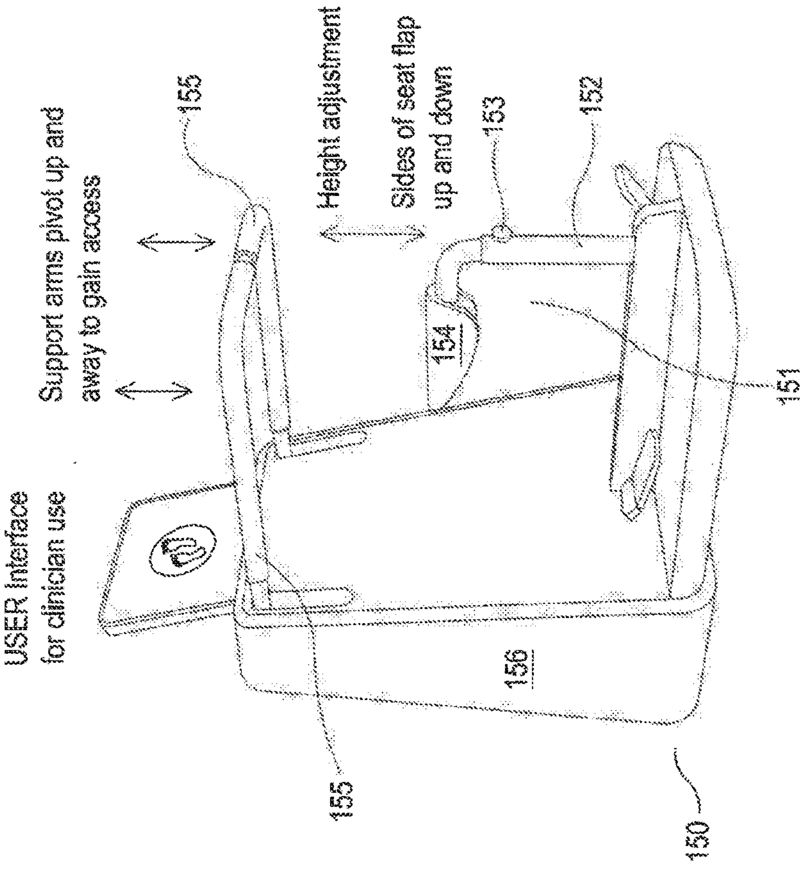
FIGS. 15*a*, 15*b* illustrate an embodiment of apparatus suitable for a wheelchair user.
Figure 15B:
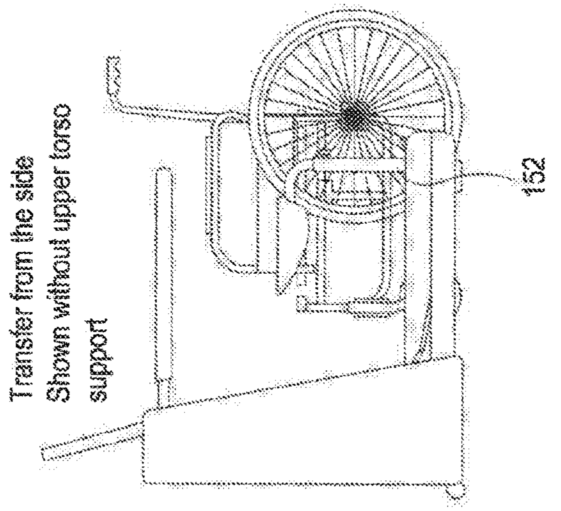
Figure 16C:
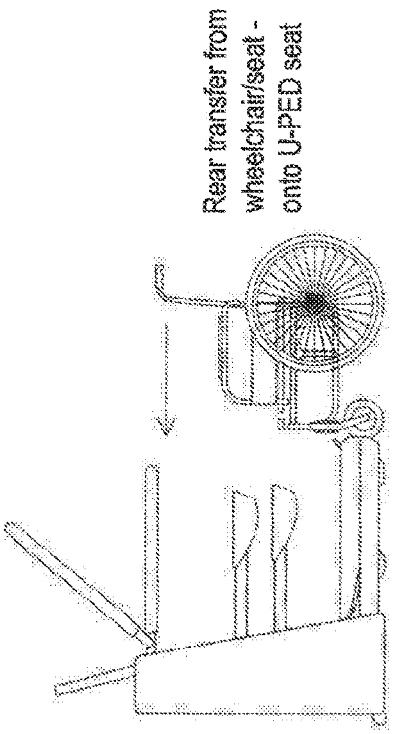
FIGS. 16*a*-16*c* illustrate a further embodiment of apparatus suitable for a wheelchair user.
Figure 16B:
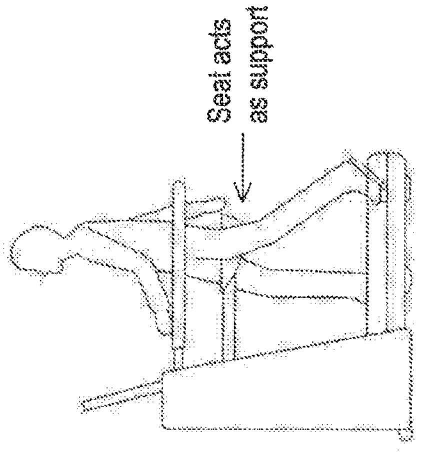
Figure 16A:
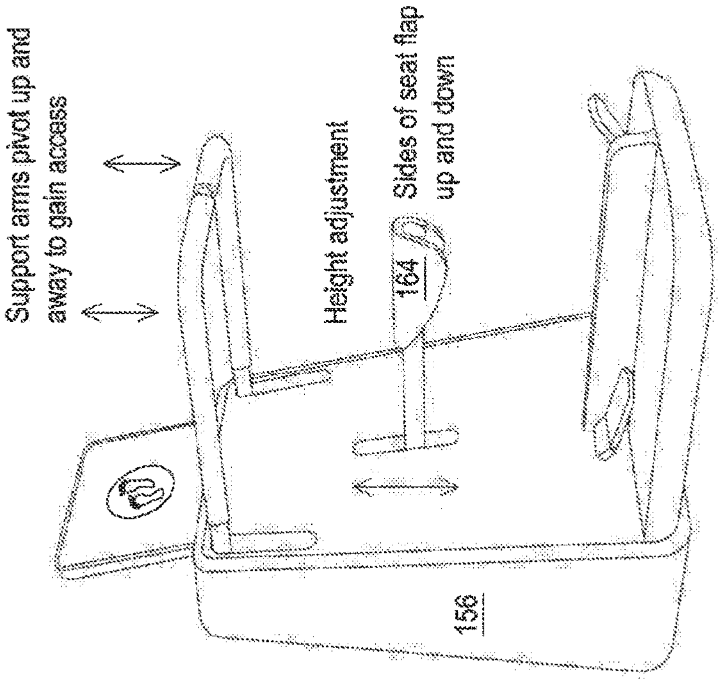

Turning to FIG. 15, these illustrate an embodiment of apparatus suitable for use by a person in a wheelchair or who has little strength in one or both of their legs. The apparatus 150 has a seat arrangement 151 supported on a stand 152. The height of the seat arrangement 151 can be adjusted by release or engagement of the knob 153. The seat 154 of the seat arrangement 151 as illustrated is in the form of a saddle. The sides of the seat 154 can however be raised if required to form a more conventional seat surface for the user. In order to assist a user and also to improve the safety of the apparatus 150, support arms 155 are provided on which a user can support themselves using their arms. To aid a user in gaining access to and getting down from the apparatus 150, the support arms 155 are pivotally mounted to the main body 156 of the apparatus 150. A user-interface enables a supervisor to adjust the parameters of the apparatus to suit the user. The apparatus of FIG. 16 is similar to that shown in FIG. 15, but with the seat 164 being mounted, for support, to the main body 156 rather than to a support stand.

Figure 17A:
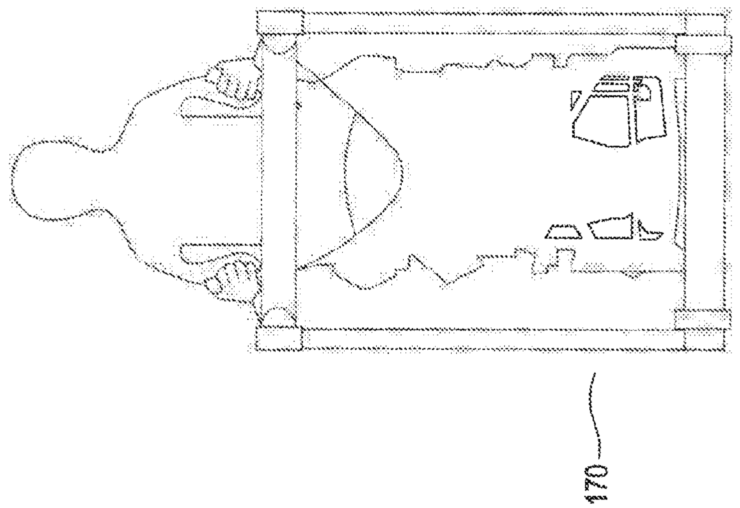
FIGS. 17*a*, 17*b* illustrate an apparatus having a sling support for a user.
Figure 17B:
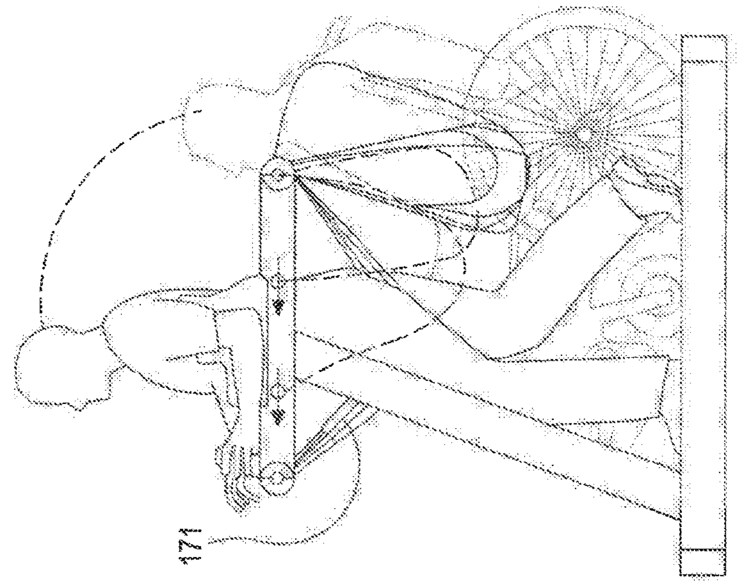

With regard to FIG. 17, the apparatus 170 shown herein has a support sling 171 to provide support to a user during use.

Figure 18:
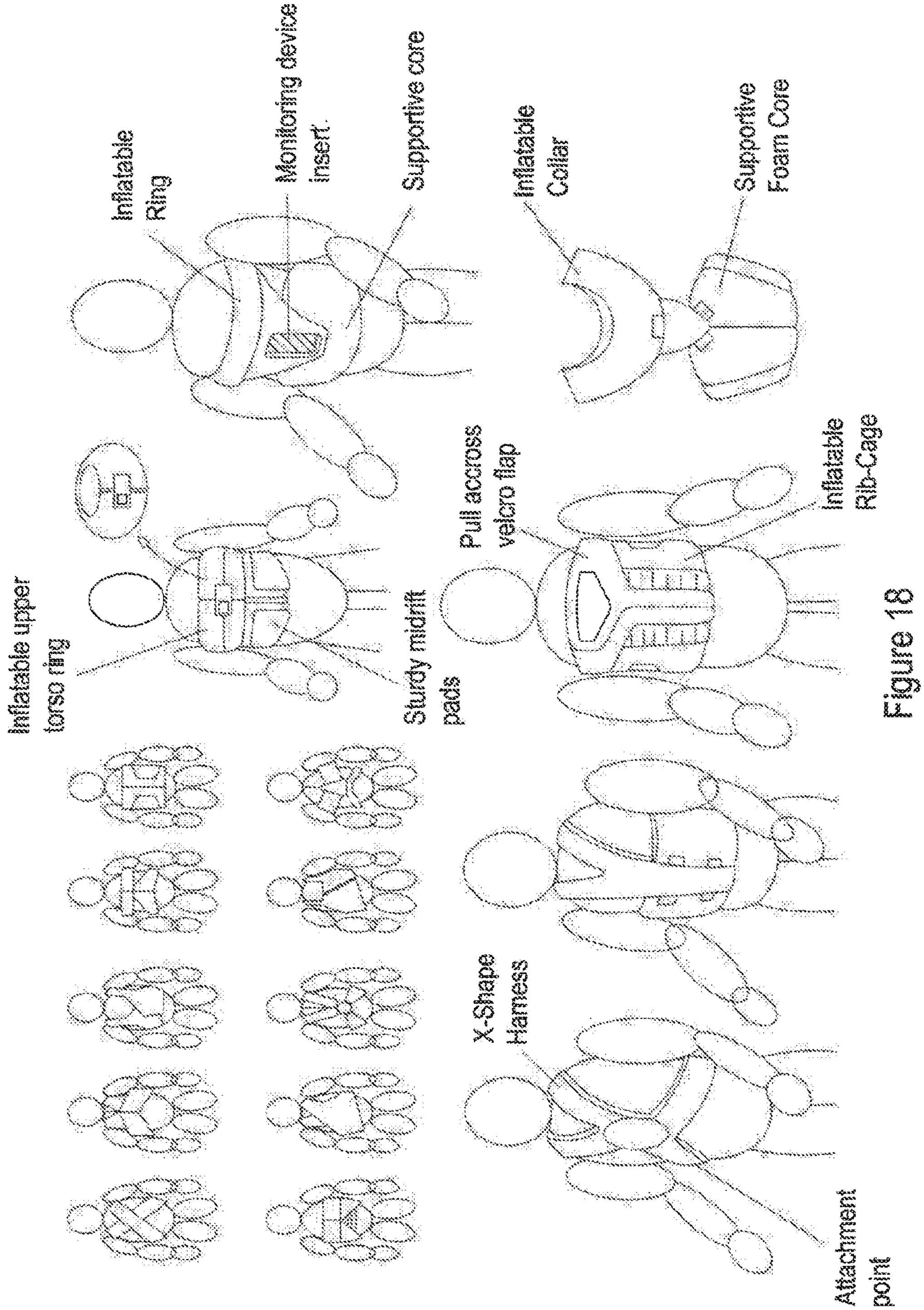
FIG. 18 illustrates embodiments of designs for a support vest.

In FIG. 18, are illustrated embodiments of a support vest which provides assistance to a user of the apparatus as disclosed herein. The support vest fits around the torso of a user, such that it contacts the user across a broad surface or at parts of a user's body which can hold a user's weight without causing discomfort. Additionally, the support vest also includes means to allow the vest to be attached to the apparatus, which then acts to support the weight of the user, both in moving a user from a seated position, and also in supporting a user in an upright, walking orientation during use. This obviates the need for the user to be supported on a chair or the like, and so aids in the user being able to relearn a natural walking gait.

Figures 19A, 19B, 19C, 19D:
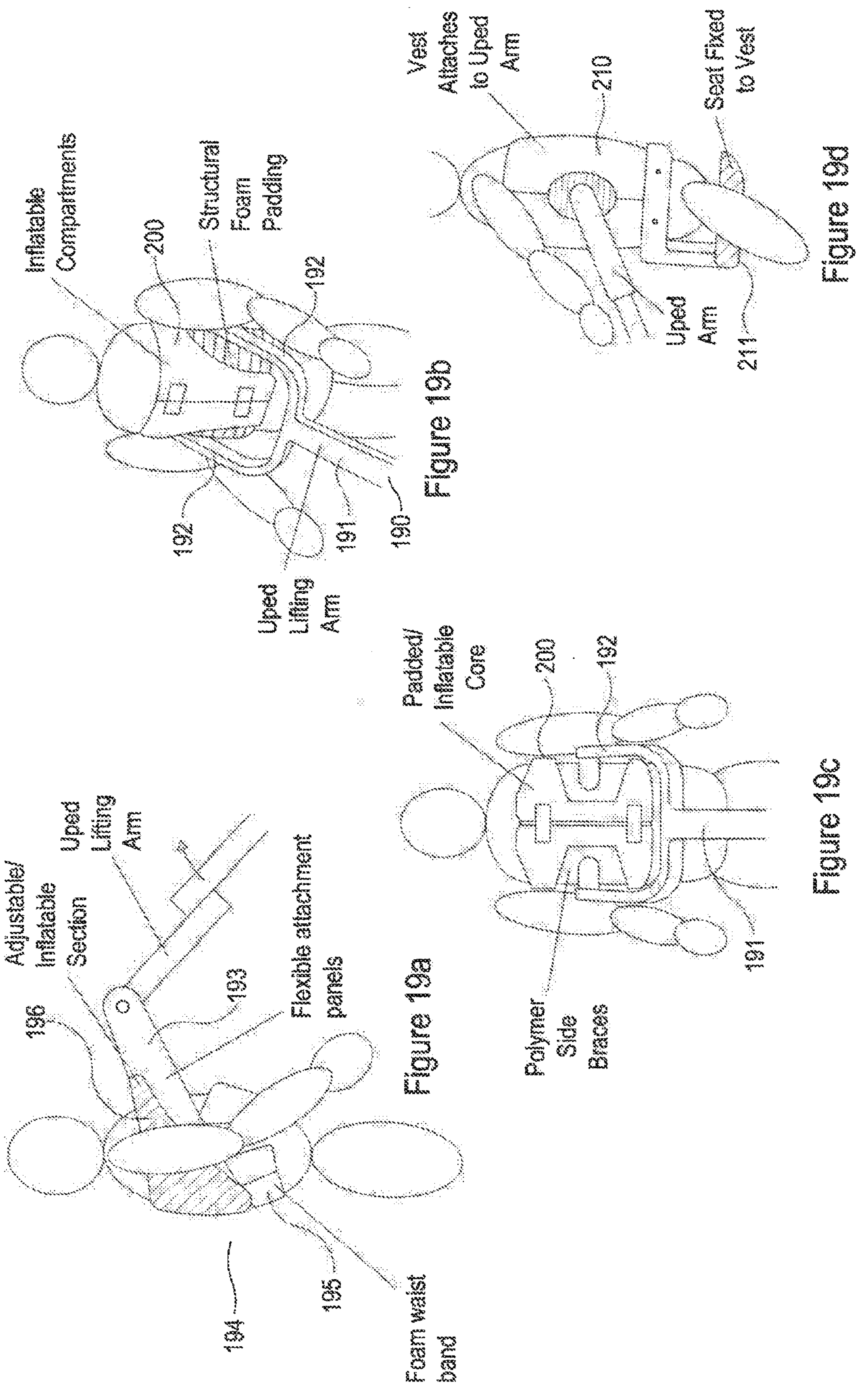
FIGS. 19*a*-19*d* illustrate support for a user wearing a support vest.

FIGS. 19*a*-19*d* illustrate the operation of a support vest of the type shown in FIG. 18 with a support arm 190. In the illustrated embodiment, the support arm 190 has a central member 191, from the end of which extend attachment fingers 192. The ends of the attachment fingers 192 include means of attachment, known in the art, which allow the ends to be releasably pivotally secured to a support vest. In FIG. 19*a*, the support arm 190 is attached to a support panel 193 of the support vest 194. A foam waistband 195 incorporated into the support vest 194, minimises discomfort to a user. Additionally, the support vest 194 includes an inflatable under-arm section 196, again to minimise discomfort under the arms, where a large portion of the weight would be borne.

In FIGS. 19*b*-19*c*, the fingers attach to a receiver in the support vest 200. The support vest 210 of FIG. 19*d* includes a seat 211 on which the user can stabilise and support themselves whilst using the apparatus.

Figure 20B:
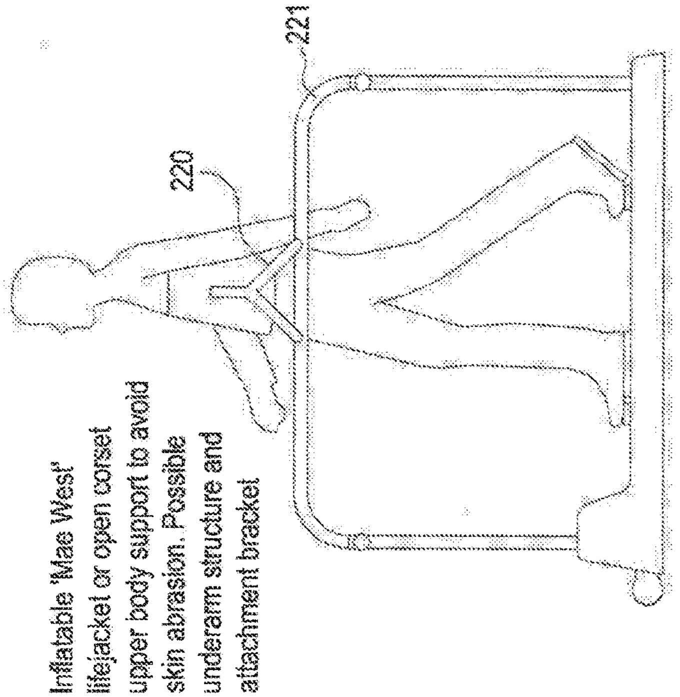
FIGS. 20*a*, 20*b* illustrate an apparatus in accordance with the invention and a user using said apparatus, whilst wearing a support vest.
Figure 20A:
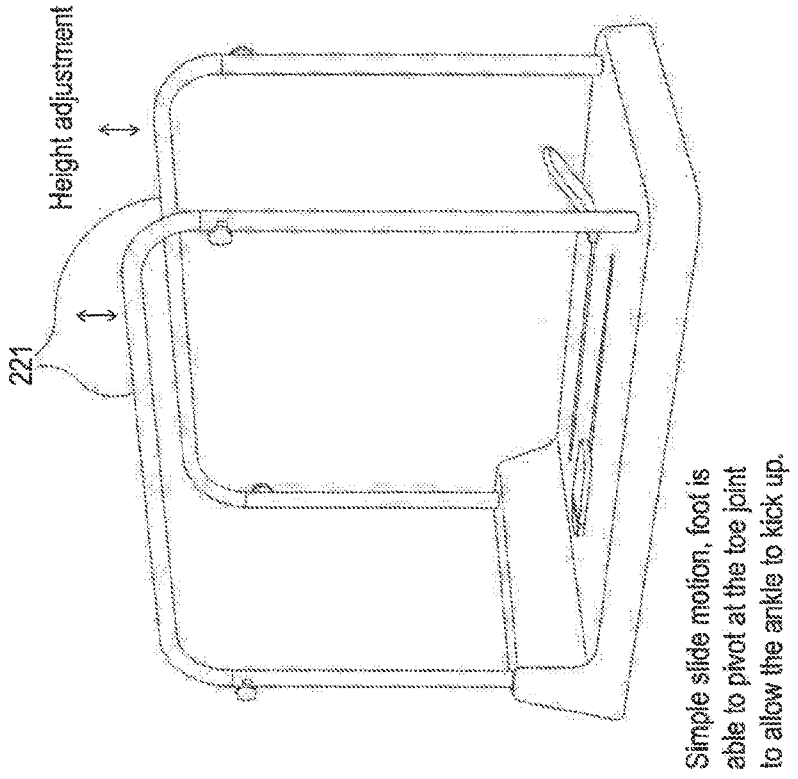

In FIG. 20, an alternative means of supporting a support vest and user, relative to the apparatus is disclosed. In this embodiment, the support vest is mounted to a support bracket 220, located on the arms 221.

The invention claimed is:

1. An apparatus to aid walking, the apparatus comprising a base unit, housing a motor; and further comprising first and second horizontally orientated foot supports, mounted for back and forth parallel motion relative to the base unit;

the foot supports each being operably connected to the motor;

each foot support comprising a plurality of planar members arranged in a Z-plate mechanism including a base plate, an intermediate plate and a foot plate having an upper surface adapted to receive a user's foot, each of the intermediate plates being pivotally linked at a first end to its respective base plate and at a second end to its respective foot plate, wherein each of the intermediate plates are pivotally coupled to an underside of its respective foot plate part-way between a centre and a front end of its respective foot plate.

2. The apparatus according to claim 1, wherein each of the foot plates includes a retention means to retain the foot against the upper surface of each of the foot plates.

3. The apparatus according to claim 2, wherein each of the intermediate plates are includes a heel support to provide stability to the user's foot.

4. The apparatus according to claim 1, wherein the foot supports are housed for motion within channels within the base unit.

5. The apparatus according to claim 1, wherein the upper surfaces of the foot plates are below or level with an upper surface of the base unit.

6. The apparatus according to claim 1, wherein the foot supports are independently moveable of each other back and forth.

7. The apparatus according to claim 1, wherein a movement of the foot supports is linked by means of a coupling, forward motion of one of the foot supports causing rearward motion of the other foot support.

8. The apparatus according to claim 6, wherein back and forth motion of the foot supports is governed by a processor.

9. The apparatus according to claim 8, wherein the motor is variable speed.

10. The apparatus according to claim 1, wherein the apparatus includes a stop button, operation of the stop button disconnects power to the foot supports.

11. The apparatus according to claim 1, wherein the apparatus comprises two independently operable motors, the first motor driving the first foot support and the second motor the second foot support.

12. The apparatus according to claim 1, wherein one or more supports extend upwardly from the base unit to act as hand support for the user.

13. The apparatus according to claim 12, wherein a height of the one or more supports on top of the base unit is adjustable.

14. The apparatus according to claim 12, wherein the one or more supports comprises two upright support elements extending from the base unit, one rearward of the base unit and one forward of the base unit, and connected by a connecting rail.

15. The apparatus according to claim 14, wherein the upright support elements are pivotally mounted to the base unit, enabling the upright support elements to be pivoted to lie against the base unit for storage or transport.

16. The apparatus according to claim 1, wherein the motor is connected to the foot supports by one or more drive belts, the one or more drive belts being selected from one of a toothed belt and chain belt.

17. The apparatus according to claim 1, wherein its respective base plate linked by means of a hinge to its respective base plate to allow a front end of the intermediate plate to pivot away from each of the foot plates.

18. The apparatus according to claim 1, wherein its respective intermediate plate is linked by means of a hinge to its respective intermediate plate.

* * * * *